Jan. 21, 1969  L. K. LUGTEN  3,423,709
ELECTRICAL TRANSFORMER CONSTRUCTION INCORPORATING
IMPEDANCE AND FREQUENCY-RESPONSE COMPENSATION
Filed June 27, 1966
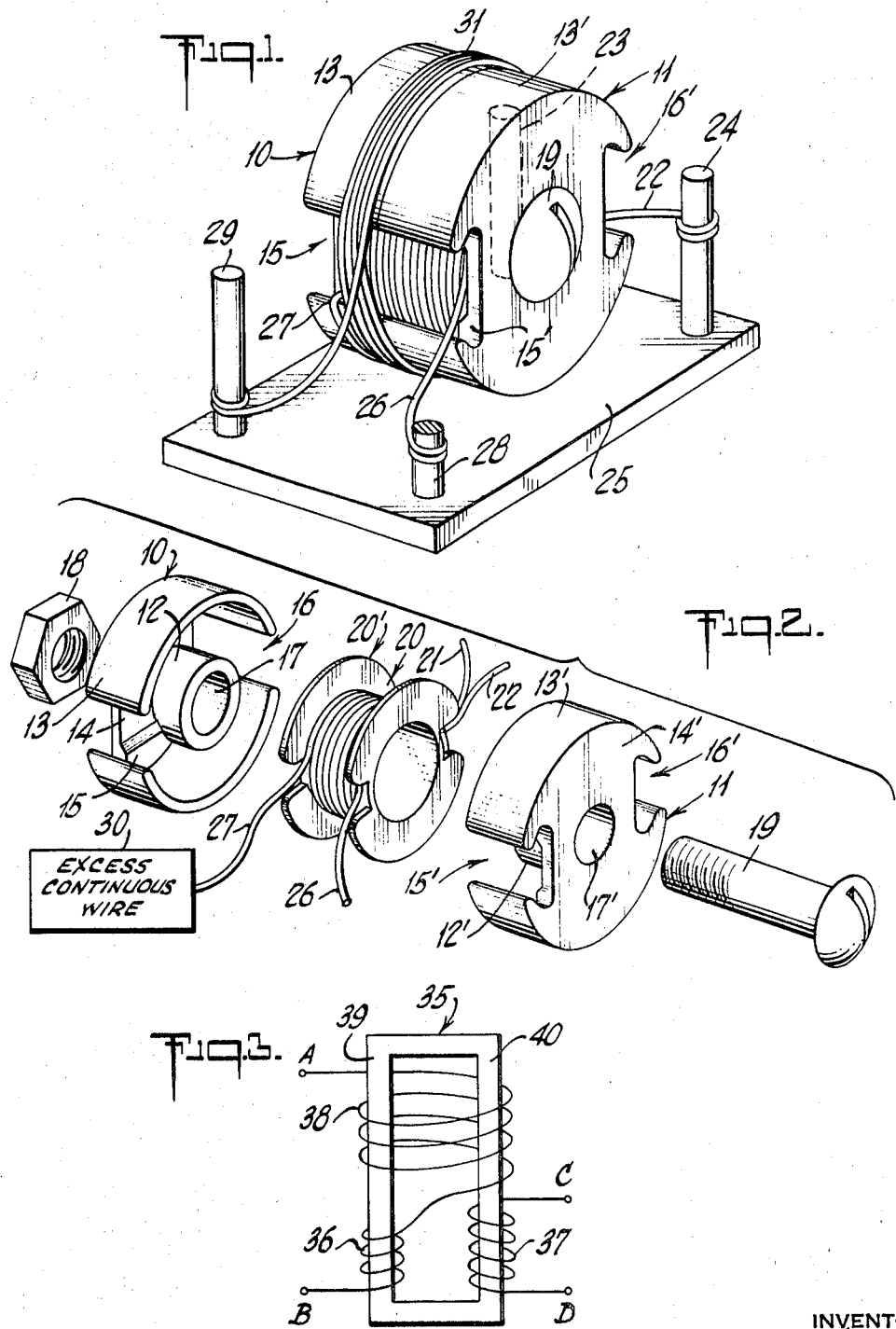
INVENTOR
LEO K. LUGTEN
BY
Hopgood & Calimafde
ATTORNEYS 3,423,709
ELECTRICAL TRANSFORMER CONSTRUCTION INCORPORATING IMPEDANCE AND FREQUENCY-RESPONSE COMPENSATION
Leo K. Lugten, St. Petersburg, Fla., assignor to Electronic Communications, Inc., a corporation of New Jersey
Filed June 27, 1966, Ser. No. 560,486
U.S. Cl. 336—83
Int. Cl. H01f 15/00
6 Claims

ABSTRACT OF THE DISCLOSURE

The invention contemplates application to a transformer having a continuous core of magnetic flux-conducting material defining a closed path or flux loop, to which the primary and secondary winding turns are coupled. The core is characterized by spaced portions or legs in which for an imposed input voltage, flux travels in opposite directions. High-frequency limitations attributable to winding capacitance are balanced by incorporating added leakage inductance in the transformer itself. This is done by series-connecting one of the transformer windings with a further winding which peripherally embraces and is thus linked to both legs.

---

My invention relates to an improved miniaturized transformer construction, particularly useful as a high-frequency circuit element in a communication system, as for example a carrier transformer in a modulator.

In such transformers for miniaturized applications, space is at a premium, and it is desired to extend the frequency characteristic beyond limitations imposed by winding capacitance. These limitations become particularly noticeable when bifilar windings are used.

It is, therefore, an object of the invention to provide an improved transformer construction wherein the effects of winding capacitance can be reduced.

Another object is to provide an improved transformer construction incorporating added leakage inductance to balance high-frequency limiting effects of winding capacitance.

It is a general object to meet the above objects with a structure of elemental simplicity, inherent low cost, and ease of manufacture, involving merely modification of a known structure, and without requiring addition of any further circuit element.

Other objects and various further features of novelty and invention will be pointed out or will occur to those skilled in the art from a reading of the following specification in conjunction with the accompanying drawing. In said drawing, which shows, for illustrative purposes only, a preferred form of the invention.

FIG. 1 is a perspective view of a circuit element embodying the invention;

FIG. 2 is an exploded perspective view of the element of FIG. 1; and

FIG. 3 is an electrical schematic diagram of the element of FIG. 1.

Briefly stated, the invention contemplates application to a transformer having a continuous core of magnetic flux-conducting material defining a closed path or flux loop, to which the primary and secondary winding turns are coupled. The core is characterized by spaced portions or legs in which for an imposed input voltage, flux travels in opposite directions. High-frequency limitations attributable to winding capacitance are balanced by incorporating added leakage inductance in the transformer itself. This is done by series-connecting one of the transformer windings with a further winding which peripherally embraces and is thus linked to both legs.

Referring to the drawings, the invention is shown in application to a miniature transformer construction involving a formed core of magnetic flux-conducting material, such as a sintered ferrite, and characterized by spaced inner and outer walls closed at opposite axial ends. In the form shown, this is effected by face-to-face abutment of two like annular cup-shaped core halves 10–11, each (as in the case of the half which is marked 10 in FIG. 1) having an inner wall portion 12, an outer wall portion 13, and an axial end 14 closing the space between walls 12–13. Spaced openings or apertures 15–16 in the outer wall 13 facilitate the accommodation of lead wires, and a central opening 17 serves securing means such as a nut and bolt 18–19, for the final assembly.

The flux path may be completed axially along walls 12–13 and radially on wall 14 by merely securing a flat closure plate at the open end of the core element 10, but in the form shown this is accomplished by the mating core half 11 of the same construction as described for element 10, similar parts being shown with the same reference numerals, with primed notation. It will be understood that when elements 10–11 are secured together (by means 18–19), the flux path may thus be said to include one portion 12–12′, spaced from another portion 13–13′; and for voltage impressed on a winding about the inner portion (12–12′) and within the outer portion (13–13′), the axial flow of flux in the spaced portions is in opposite directions.

In the form shown, the transformer windings 20 are developed on a nonmagnetic form 20′, which may be a flanged collar of nylon having bore and flanged limits for a ready reception and location in the space within core halves 10–11. The leads 21–22 for one winding (e.g., secondary) are brought out one side, through opening 16–16′, for securing to terminal posts 23–24 on a suitable base 25. The two leads 26–27 for the other winding (e.g., primary) are brought out the other side, where further terminal posts 28–29 are provided. The windings may be developed from single continuous wire or they may be bifilar, in either of which events the reference to continuous wire will be understood to be applicable; for a bifilar secondary, the mid-point connection may be secured to another terminal post 23′, as will be understood.

In accordance with the invention, one of the transformer windings (e.g., the primary) is provided at one end with substantial excess wire 30 so that the turns thereof may be series-formed and directly connected with an added leakage inductance. In the form shown, this is accomplished by further winding the excess continuous wire 30 about the outer wall 13–13′, the number of turns being appropriate to the desired balancing of winding capacitance at 20. The respective secondary leads are then secured at posts 28–29. It will be appreciated that turns 31 of the leakage-inductance winding are linked to both opposed core portions 12–12′ and 13–13′, and that for ease of assembly these further turns may be developed on wall 13 alone, i.e., prior to completion of the core by assembly of the core half 11 thereto.

In FIG. 3, for simplified understanding, I schematically depict my assembled transformer of FIGS. 1 and 2 as comprising the core 35 defining a continuous flux-loop path to which the primary turns 36 and the secondary turns 37 are coupled, between terminals A–B and C–D, respectively. The further (leakage-inductance) turns 38 are directly and integrally connected in series with the primary 36, being coupled or linked to opposed or spaced parts or legs 39–40 of the core.

It will be appreciated that I have described a simple, easily fabricated structure in which the high-frequency end of the characteristic may be extended, by balancing the winding capacitance with easily controlled added leakage inductance. For example, in a typical miniature transformer having a five-turn primary and a 60-turn secondary, the input impedance is 18 ohms (with secondary terminated in 3600 ohms) and the upper frequency limit of utility is in the region of 100 to 150 kc./s.

But if seven turns are used at 31 (38) for the leakage-inductance winding, the characteristic which had been limited (by winding capacitance) at about 150 kc./s. is thereby extended to substantially 550 kc./s., at which point the input impedance is about 25 ohms (with secondary terminated in 3600 ohms).

It will be appreciated that for ruggedness, the entire described structure may be potted in a suitable compound and that, although described in detail for the preferred form shown, the invention may be modified without departing from the scope as defined in the claims which follow.

What is claimed is:
1. An electrical transformer:
including an annular cup-shaped core of magnetic flux-conducting material,
said core comprising spaced inner and outer walls and spaced annular end-closure walls connecting said inner and outer walls,
primary and secondary winding means in the space between said walls and linked solely to said inner wall,
and a further winding peripherally carried by said outer wall and linked to both said inner and outer walls,
the turns of said further winding being series-connected with the turns of one of said winding means.

2. An electrical transformer according to claim 1 in which said core comprises two like annular cup-shaped core elements with spaced inner and outer walls closed at one axial end and means retaining said core elements in end-to-end assembled relation, with the closed ends at the axial ends of the assembly.

3. A transformer according to claim 2, in which the outer wall of said core has an opening, and in which a single continuous wire defines said further winding and said one winding means with an integral connection through the opening.

4. A transformer according to claim 2, in which said further winding is connected to the primary and said secondary winding means is bifilar.

5. An electrical transformer:
including a continuous core of magnetic flux-conducting material comprising two spaced outer legs and an inner leg spaced between said outer legs,
primary and secondary winding means in the space between said outer legs and linked solely to said inner leg,
and a further winding peripherally carried by said outer legs and linked to both said inner and outer legs,
the turns of said further winding being series-connected with the turns of one of said winding means.

6. A transformer according to claim 5, in which the outermost surfaces of said outer legs are rounded to arcuate contour generally symmetrically about said inner leg.

References Cited

UNITED STATES PATENTS

| | | | |
|---|---|---|---|
| 1,561,782 | 11/1925 | Given | 336—83 XR |
| 2,786,983 | 3/1957 | Hill | 336—83 |
| 2,870,334 | 1/1959 | Crofts | 336—83 XR |
| 2,914,721 | 11/1959 | Kohn | 336—183 XR |
| 3,197,167 | 7/1965 | Sturgis | 336—83 |

LEWIS H. MYERS, *Primary Examiner.*

T. J. KOZMA, *Assistant Examiner.*

U.S. Cl. X.R.

336—170, 184